Feb. 14, 1956     W. H. PURDIE ET AL     2,734,492

FUEL INJECTION SYSTEMS FOR INTERNAL-COMBUSTION ENGINES

Filed Feb. 26, 1952     5 Sheets-Sheet 1

Inventors
William Hamilton Purdie,
Percy Jackson &
John George Gunn
By Hooper, Leonard & Gunn
Their attorneys

United States Patent Office 2,734,492
Patented Feb. 14, 1956

2,734,492

FUEL INJECTION SYSTEMS FOR INTERNAL-COMBUSTION ENGINES

William Hamilton Purdie, Percy Jackson, and John George Gunn, Sunderland, England, assignors to William Doxford and Sons Limited, Sunderland, England, a British company Application February 26, 1952, Serial No. 273,503

Claims priority, application Great Britain February 26, 1951

9 Claims. (Cl. 123—41)

The invention relates to air-less fuel injection systems for reversing internal combustion engines operating on the diesel or semi-diesel cycles (e. g. marine engines of the opposed piston two-stroke cycle type) and has for an object the provision of a fuel system in which the need for special reversing cams and other reversing gear is obviated.

The invention is based on the facts that if the measured output from a fuel pump is stored under pressure (i. e. in a hydraulic accumulator) it may be injected into the engine cylinders by the storage pressure on the opening of a discharge valve at or just before the end of the engine compression stroke, that the end of the injection may be determined by exhaustion of the stored fuel (i. e. be independent of the closing of the valve so long as the valve is open for a period sufficient for injection to be effective) and that consequently the opening of the valve may be effected by an eccentric cam or other member rotating with the engine and formed to open the valve at the appropriate time for each direction of rotation without regard to the time of closing subject to the limitation that the valve must remain open long enough for injection to be completed.

The invention provides, in a reversing engine of the above kind, an air-less fuel injection system having a fuel pump, delivering for each firing stroke the appropriate amount of fuel, a hydraulic accumulator for storing under pressure the pump output for injection into the engine cylinder, a discharge valve controlling the outlet from the accumulator to the engine cylinder and an eccentric, crank, cam or the equivalent for operating, directly or indirectly, the valve and rotatable in timed relation with the engine and so shaped and positioned with respect to the engine and valve that the valve will be opened at, or shortly before, the end of the engine compression stroke for each direction of rotation of the engine and will remain open at least as long as is required for injection of the fuel.

In a preferred form of the invention the eccentric, cam or the equivalent is, when the engine is at the end of the compression stroke, substantially symmetrical, at least over the portions effecting opening of the valve, in relation to the valve so that the valve will be opened with substantially the same timing in relation to the engine for each direction of rotation of the engine.

The pump may be of the reciprocatory type and the valve aforesaid constitute the discharge valve for the pump.

Preferably the valve is constituted by a port covered and uncovered by the pump plunger.

Some specific constructions of fuel injection systems embodied in engines in accordance with the invention will now be described, by way of example, with reference to the drawings in which.

In each of these examples the engine operates on the two-stroke full diesel cycle and has three operating cylinders. The engine is of the opposed piston type, is reversing and intended for marine use. The engine has for each cylinder a fuel pump unit. These units are, in each engine, all operated from a shaft 1 which is common to all the cylinders and is driven from the engine at engine speed. In each engine all of the pump units are of the same construction and the following descriptions relate to only one of the units embodied in each engine.

Figure 1:
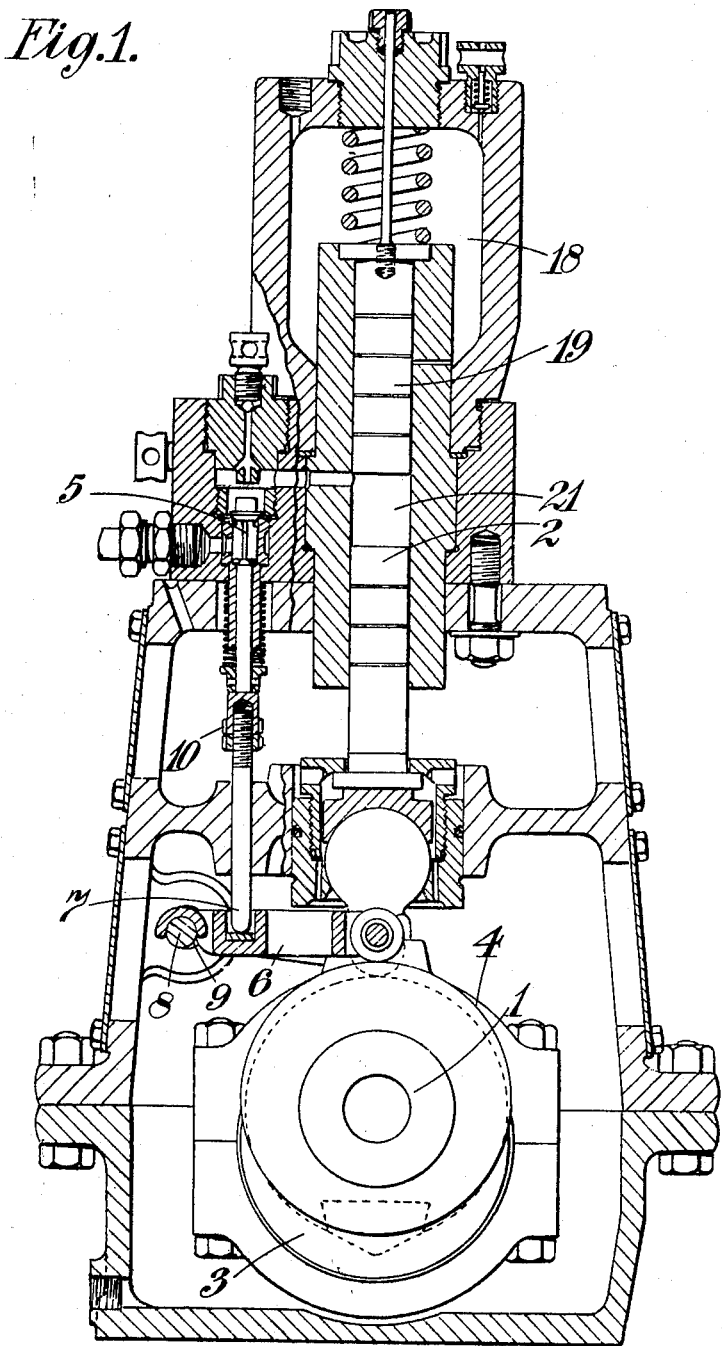
Figure 1 represents a cross-section through a fuel pump unit.
Figure 2:
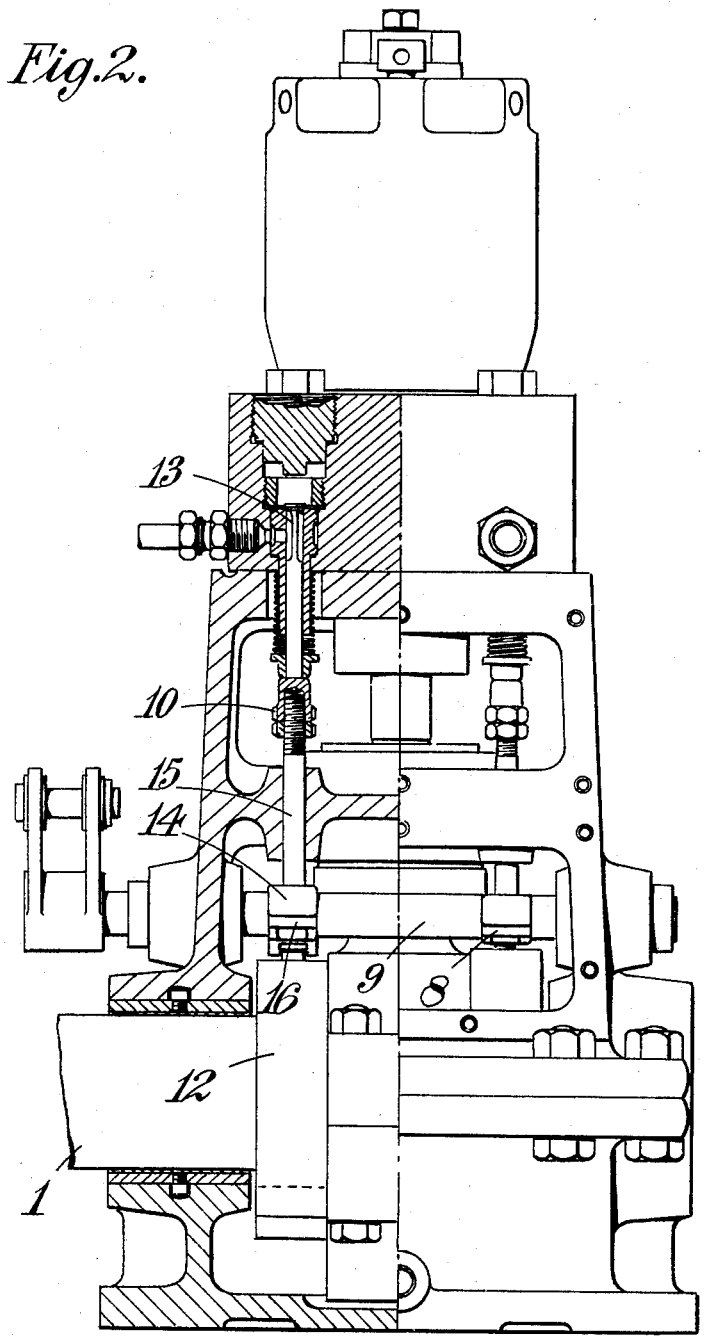
Figure 2 is a side view of the unit shown in Figure 1, partly in section, showing the discharge valve.

In the first unit, shown in Figures 1 and 2, the pump plunger 2 is driven by the eccentric 3 mounted on the shaft 1 and alongside the eccentric 3 is an eccentric 4 operating a valve 5, through the lever 6 and tappet 7. The valve 5 is the inlet valve for the pump and also controls the quanity of fuel pumped. The lever 6 is fulcrummed on an eccentric 8 on a shaft 9 and the tappet rod 7 has adjusting nuts 10. On the other side of the eccentric 3 there is a cam 12 which operates the discharge valve 13 through the lever 14 and tappet 15. The lever 14 is also mounetd on an eccentric 16 on shaft 9 and the tappet 15 is also provided with adjusting nuts 16. The pump is provided with an accumulator chamber 18 and an accumulator plunger 19. The accumulator chamber 18 is pumped up with oil to a high pressure (i. e. the minimum injection pressure) by external means. The chamber is maintained full or substantially full of oil.

The operation of the pump is as follows. As the eccentric 3 is turned by the engine the pump plunger 2 makes its upward stroke during the compression stroke of the engine and fuel is returned from the pump cylinder through the inlet and quantity control valve 5 to the fuel supply. When the valve 5 is permitted to close by rotation of the eccentric 4 and motion of the lever 6 and tappet 7, the fuel to be injected into the engine cylinder is trapped in the space 21 between the two plungers and continued upward movement of the plunger 2 lifts the accumulator plunger 19 against the pressure in the chamber 18. At the correct time in the engine cycle the cam 12 lifts the timing valve 13 through the action of the lever 14 and tappet 15 and injection into the engine cylinder of the fuel in the space 21 then takes place by downward movement of the accumulator plunger 19 under the action of the pressure in the accumulator chamber 18. Continued rotation of the eccentric 3 causes the down stroke of the plunger 2 and fuel is drawn into the pump chamber through the valve 5 and soon after the beginning of this down stroke of the plunger 2 the valve 13 is permitted to close by the cam 12.

Rotation of the shaft 9 adjusts the fulcrum of the lever 6 in a direction transverse to the movement of the lever and has the effect of varying the duration of the opening of the valve 5 during the upward stroke of the plunger 2 and thus of varying the quantity of fuel trapped in the chamber 18 and subsequently injected into the engine cylinder. The same rotation of the shaft 9 also varies the time of opening of the valve 13 and thus adjusts the timing of the beginning of the injection of fuel into the engine cylinder in a manner related to the quantity of fuel injected. This relation is an important feature in a marine engine where it is desirable to retard the beginning of injection during slow running, i. e. when a small quantity of fuel is being injected.

Initial setting of the several pumps to inject the same quantity of fuel into each cylinder is obtained by regulation of the nuts 10 on the tappets 7 which controls the duration of opening of the valves 5. Similarly, timing of the beginning of injection of fuel into each of the several cylinders is effected by adjusting the nuts 16 on the individual pumps to regulate the time of opening of the delivery valves 13.

The eccentrics 3 and 4 and the cam 12 are so timed that the ends of the strokes of the parts operated thereby coincide with the ends of the strokes of the engine pistons. Further the cams and eccentrics are symmetrical with respect to their high and low points. Consequently the pump will deliver the same quantity of fuel, for any given position of the shaft 9, and will give the same timing for the beginning of injection without regard to the direction of rotation of the engine and it is therefore unnecessary to provide any reversing gear for the pump to obtain ahead or astern running of the engine.

If desired the pressure chamber 18 in the above example may be replaced by springs acting on top of the accumulator plunger 19. Alternatively a chamber of larger cross-section may be employed and air-pressure therein be used to urge the plunger inwardly. In this arrangement the plunger has an enlarged head making an air-tight sliding fit within its chamber.

Figure 3:
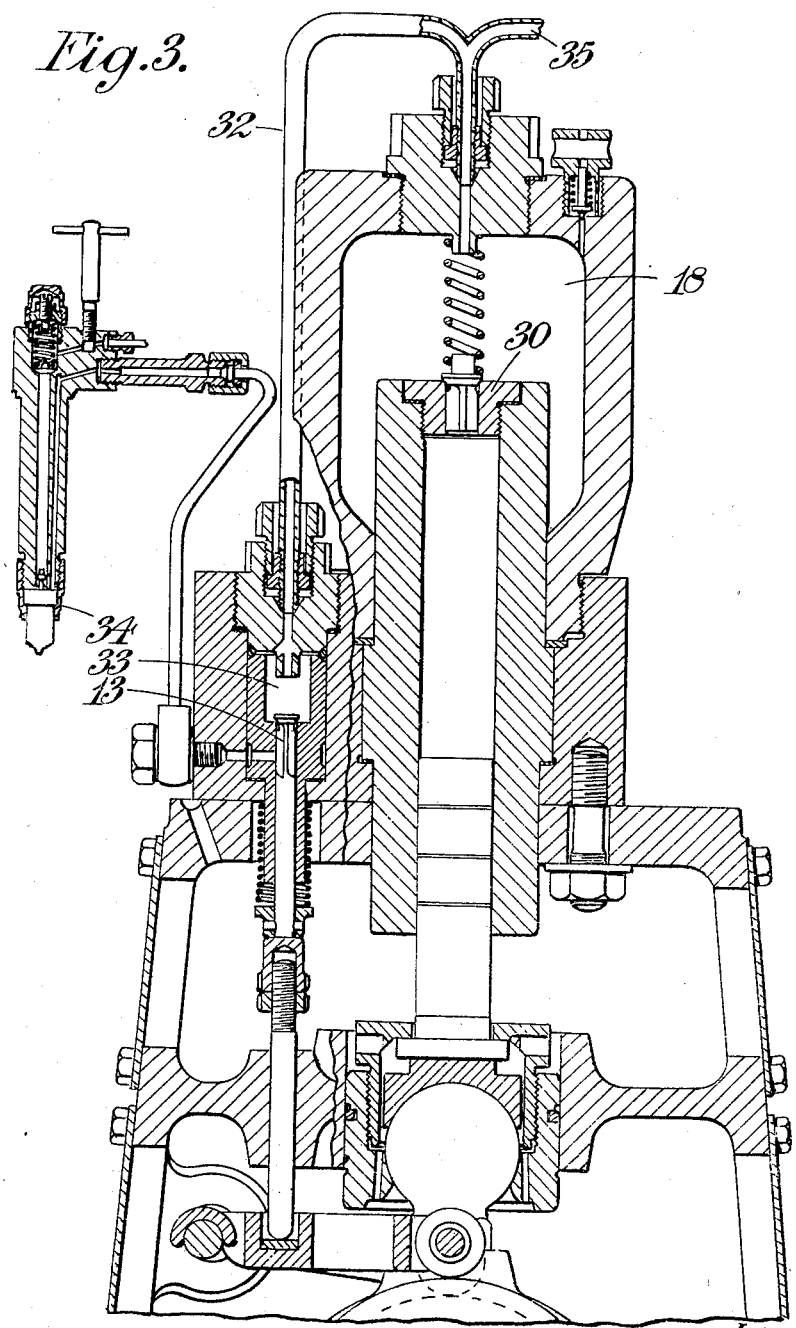
Figure 3 represents a section through a second form of fuel pump unit showing the discharge valve.

The unit shown in Figure 3 is a modification of that just described. The accumulator plunger has been omitted and a non-return delivery valve 30 has been added. Further the pump outlet to the discharge valve 13 is by way of valve 30, chamber 18, pipe 32 and chamber 33. In this example the fuel delivered by the pump after the quantity valve has closed is stored, under pressure in chamber 18 and pipe 32 until the valve 13 opens when delivery to the injection nozzle 34 begins.

If desired all of the units constructed as shown in Figure 3 in an engine may be connected together through a pipe 35 and to a common charging pump for initially charging the chambers 18.

Figure 4:
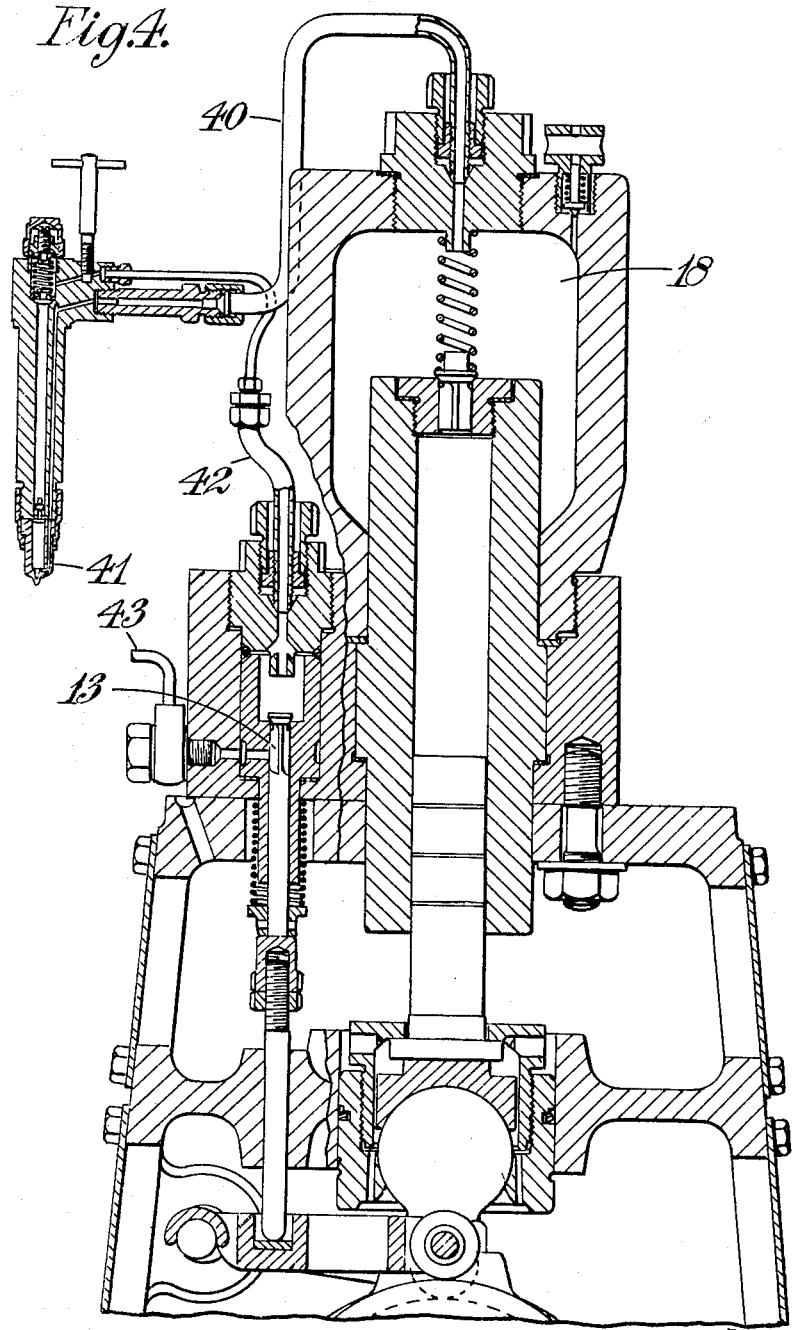
Figure 4 represents a section through a third form of fuel pump unit, showing the discharge valve.

Figure 4 shows a modified arrangement of the unit shown in Figure 3. In this arrangement the pump outlet is taken by a pipe 40 to the inlet of the fuel injection valve 41, which is of the well-known hydraulically loaded and controlled type designed to open automatically when pressure in a release pipe 42 is released. In this example the valve 41 is the discharge valve. The pipe 42 is connected to the top of valve 13. A pipe 43 is taken from the outlet of the valve 13 to a drain tank or to the pump inlet. When the valve 13 is closed pressure in the release pipe 42, derived from the pump through valve 41, holds the injection valve 41 closed, but when the valve 13 is lifted the pressure in pipe 42 and thus on the upper face of the injection valve is relieved and the pressure from chamber 18 acting through pipe 40 on the under face of the injection valve causes this valve to lift and injection to take place. Consequently the mechanical opening of valve 13 controls the opening of the discharge or injection valve 41 and the beginning of injection.

Modification may be made in the constructional details described in the above examples. For instance, instead of the eccentric 3 and its associated eccentric strap a cam and roller may be used in conjunction with a return spring for operating the pump plunger 2, and the eccentric 4 may be replaced by a cam. Further an eccentric may be used in place of the cam 12.

Figure 5:
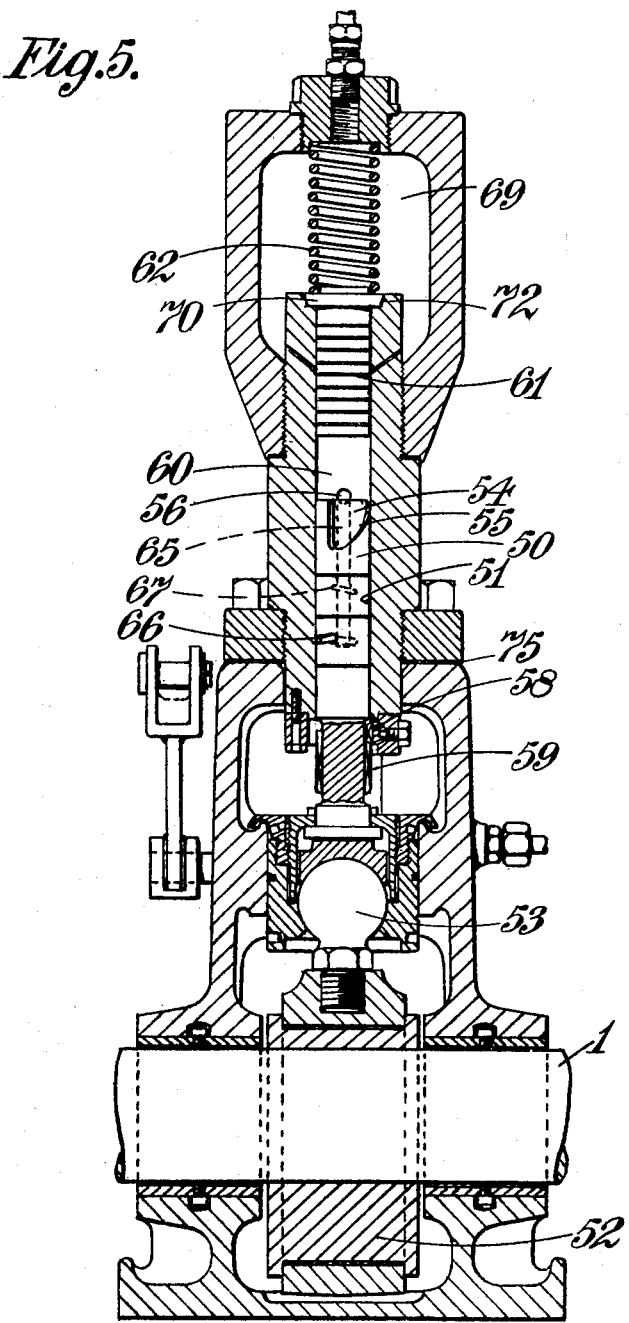
Figure 5 represents a section through a fourth form of fuel pump unit.

Figure 5 shows a further form of a pump unit which, on account of its simplicity, is to be preferred for many applications. In the unit the quantity and timing valves consist of ports in the cylinder wall in conjunction with the pump plunger.

The pump plunger 50 is reciprocated in a cylinder 51 by an eccentric 52 on shaft 1, and connecting rod 53. The plunger has a recess 54 bounded, on one side, by a helical step 55. The step co-operates with a port 56 in the cylinder wall to constitute the inlet and quantity control valve. The port 56 communicates with a pipe connection 57 to a supply of fuel oil. The plunger 50 can be rotated by a rack 58 engaging pinion teeth 59 cut in the lower end of the plunger. Movement of the rack determines the point in the upward motion of the plunger 50 when the step 55 closes the port 56 and hence the quantity of fuel trapped in the space 60 when the port is closed, this being the fuel pumped. Above the space 60 there is an upper plunger 61 which operates in a manner similar to the plunger 19 in Figure 1. A spring 62 applies additional pressure to the plunger 61.

The plunger 50 has an axial throughway 65 leading to a circumferential groove 66 which co-operates with a port 67 in the cylinder wall, the port leading to a connection to the cylinder injection valve.

In the operation of the pump, fuel is drawn into the cylinder through the port 56 during the downward movement of the plunger 50. During the first part of the upward movement of the plunger (i. e., until the step 55 closes port 56) a portion of the fuel is returned to the supply. Further upward movement causes plunger 61 to be raised until port 67 is uncovered when the plunger 61 descends rapidly and forces the measured quantity of fuel trapped between the two plungers to the injection nozzle.

The groove 66 and port 67 are given a helical inclination around the plunger 50 so that as the plunger is rotated to give a greater quantity of fuel, the uncovering of port 67 and injection of fuel take place at an earlier timing. Conversely as the plunger is rotated to pump less fuel, with consequent reduction in engine speed, the time of the opening of the pump is delayed.

As in the previous examples the eccentric 52 is positioned on the shaft 1 so that the plunger 50 reaches the upper limit of its travel simultaneously with the end of the compression stroke of the engine cylinder. Consequently the beginning of delivery from the pump (i. e. when port 67 is uncovered) will be the same in relation to the engine for both directions of rotation of the engine. The speed of delivery of the fuel is determined by the speed at which the fluid pressure in chamber 60 and spring 62 drives the plunger 61 downwardly which speed will be the same for both directions of rotation. The end of injection occurs when the collar 70 seats on the top of cylinder 51 and is independent of the direction of rotation. The point at which port 56 is covered and hence the quantity of fuel pumped is the same for each direction of rotation. The pump will accordingly, like those previously described, operate equally in both directions of rotation without any reversing gear.

In order to reduce the shock and noise which results when the collar 70 strikes the top of the cylinder 51, the collar has a conical surface 72 which seats in a corresponding surface on the cylinder so that oil trapped between the surfaces acts as a dashpot.

The thickness of packing 75 may be varied to adjust the relative timings of the several pumps of the engine cylinders.

We claim:

1. A fuel injection system for a reversible internal combustion engine comprising a pump chamber with inlet and outlet connections, a reciprocable pump piston in said chamber, engine-driven means for operating said pump piston in timed relation with the engine so that the end of the pump operating stroke substantially coincides with the end of the engine compression stroke, an accumulator piston in said chamber, resilient means urging said accumulator piston inwardly of the pump chamber whereby fuel displaced by the pump is stored in said chamber under pressure, a discharge valve controlling delivery through said outlet connection, and engine-driven means for operating said discharge valve in timed relation with the engine arranged so that the valve is opened shortly before the end of the engine compression stroke for each direction of rotation of the engine and so that the valve will remain open at least as long as is required for injection of the fuel.

2. A fuel injection system for a reversible internal combustion engine comprising a pump chamber with inlet and outlet connections, a reciprocable pump piston in said chamber, engine-driven means for operating said pump piston in timed relation with the engine so that the end of the pump operating stroke substantially coincides with the end of the engine compression stroke, an accumulator piston in said chamber, resilient means urging said accumulator piston inwardly of the pump chamber, an inlet valve in said inlet connection, engine-driven means for operating said inlet valve to close during the pumping stroke of said pump piston whereby fuel is then trapped in said pump chamber and accumulated under pressure in the chamber during the remainder of the pumping stroke by displacement of the accumulator piston, a discharge valve controlling delivery through said outlet connection, and engine-driven means for operating said discharge valve in timed relation with the engine arranged so that the valve is opened shortly before the end of the engine compression stroke for each direction of rotation of the engine and so that the valve will remain open at least as long as is required for injection of the fuel.

3. A fuel injection system according to claim 2 wherein said inlet valve is constituted by a port in said chamber which is covered by the pump piston during the latter part of the pumping stroke.

4. A fuel injection system according to claim 2 wherein the engine-driven means for operating said inlet valve comprises an engine-driven eccentric.

5. A fuel injection system for a reversible internal combustion engine comprising a pump chamber with inlet and outlet connections, a reciprocable pump piston in said chamber, engine-driven means for operating said pump piston in timed relation with the engine so that the end of the pump operating stroke substantially coincides with the end of the engine compression stroke, an accumulator piston in said chamber, resilient means urging said accumulator piston inwardly of the pump chamber, an inlet valve in said inlet connection, engine-driven means for closing said inlet valve during the pumping stroke of said pump piston whereby fuel is then trapped in said pump chamber and accumulated under pressure in the chamber during the remainder of the pumping stroke by displacement of the accumulator piston, means for adjusting the time of closing of said inlet valve with respect to the movement of the pump piston, a discharge valve controlling delivery through said outlet connection, and engine-driven means for operating said discharge valve in timed relation with the engine arranged so that the valve is opened shortly before the end of the engine compression stroke for each direction of rotation of the engine and so that the valve will remain open at least as long as is required for injection of the fuel.

6. A fuel injection system for a reversible internal combustion engine comprising a pump chamber with inlet and outlet connections, a reciprocable pump piston in said chamber, engine-driven means for operating said pump piston in timed relation with the engine so that the end of the pump operating stroke substantially coincides with the end of the engine compression stroke, an accumulator piston arranged in said chamber so as to be opposed to said pump piston, resilient means urging said accumulator piston inwardly of the pump chamber, an inlet valve in said inlet connection, engine-driven means for closing said inlet valve during the pumping stroke of said pump piston whereby fuel is trapped in said pump chamber and accumulated under pressure in the chamber during the remainder of the pumping stroke by displacement of the accumulator piston, a discharge valve controlling delivery through said outlet connection, and a symmetrical engine-driven cam for operating said discharge valve in timed relation with the engine shaped so that the valve is opened shortly before the end of the engine compression stroke for each direction of rotation of the engine and so that the valve will remain open at least as long as is required for injection of the fuel.

7. A fuel injection system according to claim 6 wherein the discharge valve consists of a fuel injection valve adapted to be held closed by the pump outlet pressure and further cam-operated valve means for releasing the holding pressure on the fuel injection valve at the appropriate time for the latter valve to open.

8. A fuel injection system for a reversible internal combustion engine comprising a pump chamber having inlet and outlet ports, a reciprocable pump piston in said chamber, engine-driven eccentric for operating said pump piston in timed relation with the engine so that the end of the pump operating stroke substantially coincides with the end of the engine compression stroke, an accumulator piston arranged in said chamber so as to be opposed to said pump piston, and resilient means urging said accumulator piston inwardly of the pump chamber, the inlet port in said pump chamber being arranged so as to be covered by the pump piston during the latter part of the pumping stroke of the pump piston whereby fuel is trapped in said pump chamber during the remainder of the pumping stroke and accumulated under pressure by displacement of the accumulator piston until the outlet port is opened which outlet port is arranged and positioned so as to be uncovered by the pump piston during the final part of the inward travel and the initial part of the outward travel of the pump piston.

9. A fuel injection system for a reversible internal combustion engine comprising a pump chamber, having an outlet port, a pump piston reciprocable and axially rotatable in said chamber, one member of said chamber and piston having a helical groove leading into the pump chamber beyond the end of the piston and the other member of said chamber and plunger having an inlet port cooperating with said helical groove and leading to a fuel supply whereby an adjustable proportion of the pump output is returned to the fuel supply dependent on the angular position of said plunger, an engine-driven eccentric for operating said pump piston in timed relation with the engine so that the end of the pump operating stroke substantially coincides with the end of the engine compression stroke, an accumulator piston arranged in said chamber so as to be opposed to said pump piston, and resilient means urging said accumulator piston inwardly of the pump chamber, whereby fuel trapped in said pump chamber after said inlet port is closed is accumulated under pressure by displacement of the accumulator piston until the outlet port is opened which outlet port is arranged and positioned so as to be uncovered by the pump piston during the final part of the inward travel and the initial part of the outward travel of the pump piston.

References Cited in the file of this patent

UNITED STATES PATENTS

| | | |
|---|---|---|
| 1,897,044 | Elwell | Feb. 14, 1933 |
| 1,989,891 | Sprado | Feb. 5, 1935 |
| 2,007,246 | Goldberg et al. | July 9, 1935 |
| 2,144,132 | Walti | Jan. 17, 1939 |

FOREIGN PATENTS

| | | |
|---|---|---|
| 293,427 | Great Britain | June 20, 1929 |